United States Patent Office 3,705,910
Patented Dec. 12, 1972

3,705,910
N-(2-[4,5,6,7-TETRAHYDROBENZOTHIENYL])-PROPIONAMIDES
Charles A. Lundberg, Jr., Colonia, and John E. Engelhart, Westfield, N.J., assignors to Esso Research and Engineering Company
No Drawing. Filed May 20, 1970, Ser. No. 39,153
Int. Cl. C07d 63/18, 65/08
U.S. Cl. 260—332.2 R        4 Claims

ABSTRACT OF THE DISCLOSURE

Compounds having the following structural formula:

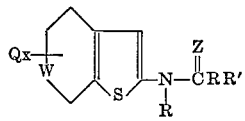

wherein W is $CH_2$ or CH—Q or a heteroatom selected from the group consisting of O, S(O)$n$, (where $n$ equals 0–2) and N—R; Q can be hydrogen, $C_1$–$C_{15}$ alkyl optionally substituted by chlorine, bromine, cyano, $C_1$–$C_4$ alkoxy, $C_1$–$C_4$ alkylthio and nitro; $C_3$–$C_{30}$ cycloalkyl optionally substituted by chlorine, bromine, cyano, $C_1$–$C_4$ alkoxy, $C_1$–$C_4$ alkylthio and nitro; $C_1$–$C_{20}$ alkoxy, $C_3$–$C_{30}$ cycloalkoxy, $C_1$–$C_{20}$ alkylthio, $C_2$–$C_{20}$ dialkylamino, $C_6$–$C_{30}$ dicycloalkylamino, cyano, chlorine, bromine, $C_2$–$C_5$ alkyl carboxy, $C_1$–$C_5$ carboalkoxy, $C_1$–$C_4$ perfluoroalkyl, thiocyano, $C_1$–$C_6$ alkylsulfoxide, $C_1$–$C_6$ alkylsulfone, $C_6$–$C_{10}$ aryl and $C_5$–$C_{20}$ heterocyclic; X ranges from 0–6 when Q is a $C_1$–$C_{15}$ optionally substituted alkyl group but for all other values of Q, X is no greater than 2; R is selected from the group consisting of hydrogen, $C_1$–$C_{16}$ alkyl, $C_3$–$C_{10}$ cycloalkyl, $C_1$–$C_{10}$ alkoxy, $C_3$–$C_{12}$ cycloalkoxy and $C_1$–$C_{10}$ alkylthio. Each of the above enumerated R groups may be optionally substituted by chlorine, bromine, cyano, $C_1$–$C_4$ alkoxy, $C_1$–$C_4$ alkylthio and nitro; R' is selected from the group consisting of; hydrogen, $C_1$–$C_{15}$ alkyl optionally substituted by $C_1$–$C_4$ alkylthio, chloro, bromo, cyano, $C_1$–$C_4$ alkoxy and nitro, $C_3$–$C_{10}$ cycloalkyl optionally substituted by $C_1$–$C_4$ alkyl, chloro, bromo and $C_1$–$C_4$ alkylthio, $C_6$–$C_{10}$ aryl, $C_6$–$C_{10}$ aryloxy, $C_6$–$C_{10}$ arylthio, $C_6$–$C_{10}$ arylamino, $C_{12}$–$C_{20}$ diarylamino, hydrazino, $C_1$–$C_6$ monoalkyl hydrazino, $C_2$–$C_{12}$ dialkylhydrazino, and $C_3$–$C_{12}$ trialkylhydrazino, $C_1$–$C_{10}$ alkylamino, $C_2$–$C_{20}$ dialkylamino, $C_2$–$C_6$ alkoxyalkylamino; Z is either O or S. These compounds have been found to possess post emergent herbicidal activity.

This invention relates to derivatives of 2-aminotetrahydrobenzothiophenes. In one aspect, this invention relates to amide and ureido derivatives of 2-amino-4,5,6,7 tetrahydrobenzothiophenes. In another aspect, this invention relates to the employment of these compounds as herbicides, particularly for post-emergent applications.

In general, the novel compounds of this invention are characterized by the following structural formula:

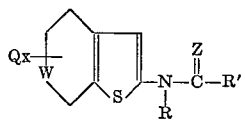

wherein W is $CH_2$ or CH—Q or a heteroatom selected from the group consisting of O, S(O)$n$, (where $n$ equals 0–2) and N–R; where Q can be hydrogen, $C_1$–$C_{15}$ alkyl optionally substituted by chlorine, bromine, cyano, $C_1$–$C_4$ alkoxy, $C_1$–$C_4$ alkylthio and nitro, $C_3$–$C_{30}$ cycloalkyl optionally substituted by chlorine, bromine, cyano, $C_1$–$C_4$ alkoxy, $C_1$–$C_4$ alkylthio and nitro, $C_1$–$C_{20}$ alkoxy, $C_3$–$C_{30}$ cycloalkoxy, $C_1$–$C_{20}$ alkylthio, $C_2$–$C_{20}$ dialkylamino, $C_6$–$C_{30}$ dicycloalkylamino, cyano, chlorine, bromine, $C_2$–$C_5$ alkyl carboxy, $C_1$–$C_5$ carboalkoxy, $C_1$–$C_4$ perfluoroalkyl, thiocyano, $C_1$–$C_6$ alkylsulfoxide, $C_1$–$C_6$ alkylsulfone, $C_6$–$C_{10}$ aryl and $C_5$–$C_{20}$ heterocyclic; X ranges from 0–6 when Q is a $C_1$–$C_{15}$ optionally substituted alkyl group, but for all other values of Q, X is no greater than 2; R is selected from the group consisting of hydrogen, $C_1$–$C_{16}$ alkyl, $C_3$–$C_{10}$ cycloalkyl, $C_1$–$C_{10}$ alkoxy, $C_3$–$C_{12}$ cycloalkoxy and $C_1$–$C_{10}$ alkylthio. Each of the above enumerated R groups may be optionally substituted by chlorine, bromine, cyano, $C_1$–$C_4$ alkoxy, $C_1$–$C_4$ alkylthio and nitro; R' is selected from the group consisting of hydrogen, $C_1$–$C_{15}$ alkyl optionally substituted by $C_1$–$C_4$ alkylthio, chloro, bromo, cyano, $C_1$–$C_4$ alkoxy, $C_1$–$C_4$ nitro, $C_3$–$C_{10}$ cycloalkyl optionally substituted by $C_1$–$C_4$ alkyl, chloro, bromo, cyano, $C_1$–$C_4$ alkylthio, $C_6$–$C_{10}$ aryl, $C_6$–$C_{10}$ aryloxy, $C_6$–$C_{10}$ arylthio, $C_6$–$C_{10}$ arylamino, $C_{12}$–$C_{20}$ diarylamino, hydrazino, $C_1$–$C_6$ monoalkyl hydrazino, $C_2$–$C_{12}$ dialkylhydrazino, and $C_3$–$C_{12}$ trialkylhydrazino, $C_1$–$C_{10}$ alkylamino, $C_2$–$C_{20}$ dialkylamino, $C_2$–$C_6$ alkoxyalkylamino; Z is either O or S.
Specific examples of compounds included in the scope of this invention are the following:

Compound Number:

1. N-(2-[4,5,6,7-tetrahydrobenzothienyl])-propionamide.
2. N-methyl-N'-(2-[4,5,6,7-tetrahydrobenzothienyl])-urea.
3. N-methyl-N'-methyl-N'-(2-[4,5,6,7-tetrahydrobenzothienyl])-urea.
4. N,N-dimethyl-N'-(2-[4,5,6,7-tetrahydrobenzothienyl])-urea.
5. N,N-dimethyl-N'-methyl-N'-(2-[4,5,6,7-tetrahydrobenzothienyl])-urea.
6. N-methyl-N'-(2-[4-methyl-4,5,6,7-tetrahydrobenzothienyl])-urea.
7. N-(2-[4-methyl-4,5,6,7-tetrahydrobenzothienyl])-propionamide.
8. N-(2-[6-methyl-4,5,6,7-tetrahydrobenzothienyl])-propionamide.
9. N-methyl-N'-(2-[6-methyl-4,5,6,7-tetrahydrobenzothienyl])-urea.
10. N-methyl-N'-(2-[5,5,7-trimethyl-4,5,6,7-tetrahydrobenzothienyl])-urea.
11. N-(2-[5,5,7-trimethyl-4,5-6,7-tetrahydrobenzothienyl])-propiopamide.
12. N-methyl-N'-(2-[5,5,7-trimethyl-7-cyano-4,5,6,7-tetrahydrobenzothienyl])-urea.
13. N,N-dimethyl-N'-(2-[5,5,7-trimethyl-7-cyano-4,5,6,7-tetrahydrobenzothienyl])-urea.
14. N-(2-[5,5,7-trimethyl-7-cyano-4,5,6,7-tetrahydrobenzothienyl])-propionamide.
15. N-(2-[5,7,7-trimethyl-5-cyano-4,5,6,7-tetrahydrobenzothienyl])-propionamide.
16. N-(2-[4,5,6,7-tetrahydrobenzothienyl])-thiopropionamide.
17. N-methyl-N'-(2-[4,5,6,7-tetrahydrobenzothienyl])-thiourea.
18. N,N-dimethyl-N'-(2-[4,5,6,7-tertahydrobenzothienyl])-thiourea.
19. N-methyl-N'-methyl-N'-(2-[4,5,6,7-tetrahydrobenzothienyl])-thiourea.
20. N,N,-dimethyl-N'-methyl-N'-(2-[4,5,6,7-tetrahydrobenzothienyl])-thiourea.
21. N-(2-[4-methoxy-4,5,6,7-tetrahydrobenzothienyl])-propionamide
22. N-methyl-N'-(2-[5-methylthio-4,5,6,7-tetrahydrobenzothienyl])-urea.
23. N-ethyl-N'-(2-[4-chloro-4,5,6,7-tetrahydrobenzothienyl])-urea.
24. N-(2-[5-nitro-4,5,6,7-tetrahydrobenzothienyl])-propionamide.
25. N-(2-[6-trifluoromethyl-4,5,6,7-tetrahydrobenzothienyl])-propionamide.
26. N-(2-[4-methoxymethyl-4,5,6,7-tetrahydrobenzothienyl])-propionamide.
27. N-(2-[6-oxa-4,5,6,7-tetrahydrobenzothienyl])-propionamide.
28. N-methyl-N'-(2-[5,5,7,7-tetramethyl-6-oxa-4 5,6,7,-tetrahydrobenzothienyl])-urea.
29. N,N-dimethyl-N'-(2-[4-chloro-6-oxa-4,5,6,7-tetrahydrobenzothienyl])-urea.
30. N-(2-[4-methoxy-6-thia-4,5,6,7-tetrahydrobenzothienyl])-propionamide.
31. N-methyl-N'-(2-[4-methylthio-6-thia-4,5,6,7-tetrahydrobenzothienyl])-urea.
32. N-methyl-N'-(2-[4-methyl-6-oxythia-4,5,6,7-tetrahydrobenzothienyl])-urea.
33. N-(2-[4-nitro-6-dioxythia-4,5,6,7-tetrahydrobenzothienyl])-propionamide.
34. N,N-dimethyl-N'-(2-[6-methyl-6-aza-4,5,6,7-tetrahydrobenzothienyl])-urea.
35. N-(2-[6-cyclohexyl-6-aza-4,5,6,7-tetrahydrobenzothienyl])-propionamide.
36. N-methyl-N'-(2-[5,5,7,7-tetramethyl-6-azo-4,5,6,7-tetrahydrobenzothienyl])-urea.

Compound Number:
37 ...... N-(2-[4-chloromethyl-6-methyl-6-aza-4,5,6,7-tetrahydro-benzothienyl])-propionamide.
38 ...... N-methyl-N'(2-[4-cyano-6-methyl-6-aza-4,5,6,7-tetrahydrobenzothienyl])-urea.
39 ...... N-(2-[6-dimethylamino-6-aza-4,5,6,7-tetrahydrobenzothienyl])-propionamide.
40 ...... N,N-dimethyl-N'-(2-[4-chloro-6-methyl-6-aza-4,5,6,7-tetrahydrobenzothienyl])-urea.

The foregoing compounds can be readily prepared by the following methods.

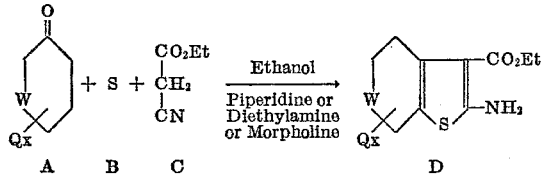

The cyclic ketone A (1 mole), ethyl cyanoacetate C (1 mole), and sulfur B (1.05 mole [1.0 to 1.1 mole]) are mixed and stirred (mechanical stirrer) in absolute ethanol (250 cc. [200 cc. to 300 cc.]) A suitable secondary amine (piperidine, diethylamine, or morpholine [the latter two amines are preferred]) is added dropwise such that the reaction temperature does not exceed 60° C. [range-room temperature to 60° C.; 45–55° C. is preferred]. When addition is complete, stirring is continued and the reaction mixture is heated in a water bath at 30–50° C. for one to three hours (two hours appears optimum). In some instances, the amino-ester D separates directly from the reaction solution on cooling; if the product does not separate thus, two to three volumes of water are added and the cloudy mixture is cooled at −10° C. overnight to yield the crystalline product D. Depending upon the starting material, yields range from 30 to 85%. (Literature reference—K. Gewald, E. Schinke and H. Bottcher, Chem. Ber., 99, 94 (1966)).

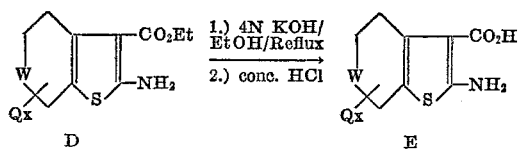

The amino-ester D (0.1 mole) is suspended in a mixture of 4 N aqueous potassium hydroxide (100 cc.) and absolute ethanol (100 cc.) and the mixture is brought to reflux with stirring. The reaction is complete when all of the starting material has dissolved and an aliquot of the reaction mixture does not become cloudy on being diluted with water (average reaction time is about 3.5 hours). The reaction mixture is cooled in an ice-water bath and neutralized to pH 7 (6.5–7.5) by slow addition of concentrated hydrochloric acid. The precipitated amino acid E is collected by suction filtration and air-dried.

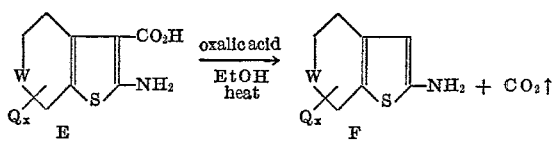

The amino acid E (0.1 mole) is suspended in absolute ethanol (or propanol) (10 cc. per gram of E). The mixture is brought to reflux on the steam bath and then removed from the heat source. A solution of oxalic acid (0.1 mole) in warm ethanol (5 cc. per gram of oxalic acid) is added to the hot solution of E in portions. Carbon dioxide evolution begins almost immediately and is allowed to proceed until gas evaluation is no longer evident. The reaction mixture is poured into water (5–7 volumes) and extracted with methylene chloride. The methylene chloride layer is washed with water and then saturated aqueous sodium chloride solution, dried over anhydrous sodium sulfate, filtered, and evaporated on a rotary evaporator. The residue, the crude amine F, is derivatized directly by one of the following methods.

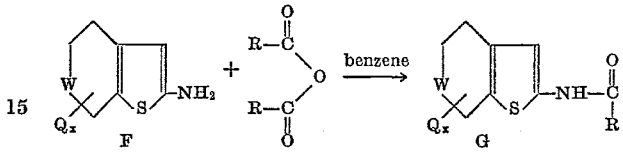

The crude amine F is dissolved in benzene (5 cc. per gram of F) and an acid anhydride (equimolar amount based on starting quantity of E whence F was generated) is added to the resultant solution. The reaction mixture is allowed to stand for one hour at room temperature and the product G is collected if it has precipitated or forced out of solution by adding an equal volume of petroleum ether if it has not precipitated

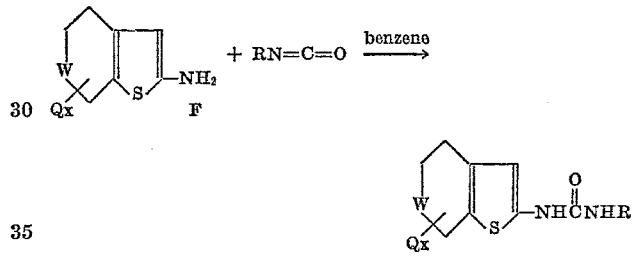

The procedure is identical to that described above except that an isocyanate is substituted for the acid anhydride.

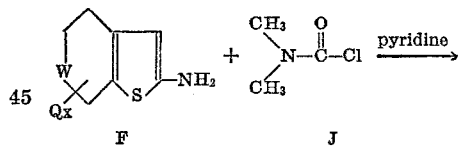

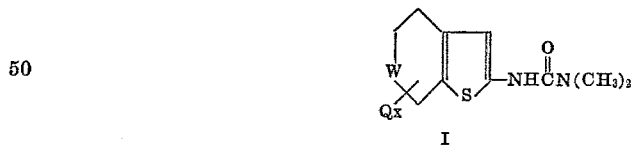

The crude amine F, dissolved in benzene (5 cc. per gram), is added to a solution of dimethylcarbamoyl chloride (equimolar amount based on starting quantity of E whence F was generated) in pyridine (5 cc. per gram). The mixture is heated on a steam bath for 1.5 hours and then evaporated on a rotary evaporator. The residue is triturated with cold water and the solid product is collected and recrystallized from 50% aqueous ethanol.

The preceding reactions may be carried out under the following broad conditions. All reactions are carried out at atmospheric pressure either in air or in an inert atmosphere.

| Reaction | Molar ratio | Solvents | Temperature, ° C. |
| --- | --- | --- | --- |
| D+4N KOH→E | D:4N KOH::1 mole:500 to 1,500 cc. (preferred 1 mole:1,000 cc.). | Aliphatic $C_1$–$C_4$ alcohol equal to the volume of 4N KOH (ethanol is preferred). | 50–150 (70–100 preferred). |
| E+oxalic acid→F | E:oxalic acid::1 mole:1 to 3 moles (preferred 1 mole:1 mole). | An aliphatic $C_1$–$C_5$ alcohol (ethanol or n-propanol preferred). | 30–175 (60–110 preferred). |
| F+acid anhydride→G | F:acid anhydride::1 mole:1 to 10 moles (1 mole:1 to 3 moles is preferred). | Neat, benzene, toluene, xylene, (benzene is preferred). | 0–100 (15–30 preferred). |
| F+isocyanate→H | F:isocyanate::1 mole:1 to 10 moles (1 mole:1 to 3 moles is preferred). | Neat, benzene, toluene, xylene (benzene is preferred). | 0–100 (15–30 preferred). |
| F+J→I | F:J::1 mole:1 to 5 moles (1 mole:1 to 2 moles is preferred). | Benzene, toluene, xylene and pyridine (benzene, pyridine preferred). | 0–150 (90–110 preferred). |

The compounds of the invention have general herbicidal properties. They are especially useful in certain types of weed control such as, for example, in application to crop lands to give control of the common weeds, without harming some crop plants; and for the control of crabgrass in lawns.

Herbicidal compositions of the invention are prepared by admixing one or more of the active ingredients defined heretofore, in herbicidally effective amounts with a conditioning agent of the kind used and referred to in the art as a pest control adjuvant or modifier to provide formulations adapted for ready and efficient application to soil or weeds (i.e., unwanted plants) using conventional applicator equipment.

Thus, the herbicidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredient with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high up to about 50% by weight or more concentration of the active ingredient can be obtained in solution.

The herbicidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually, the minimum lower concentration will be 0.1%.

The herbicidal compositions are applied either as a spray, granular or a dust to the locus or area to be protected from undesirable plant growth, commonly called weeds, i.e. plants growing where they are not wanted. Such application can be made directly upon the locus or area and the weeds thereon during the period of weed infestation in order to destroy the weeds, but preferably, the application is made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil.

In applying the herbicidal compositions of the invention for selective weed control as in the control of weeds in cotton or corn fields, the compositions are generally applied after emergence of the crop seedlings and weeds. In other words, the applications are of the post emergence type.

The active compound is, of course, applied in an amount sufficient to exert the desired herbicidal action. The amount of the active compound present in the compositions as actually applied for destroying or preventing weeds will vary with the manner of application, the particular weeds for which control is sought, the purpose for which the application is being made, and like variables. In general, the herbicidal compositions as applied in the form of a spray, dust or granular, will contain from about 0.1% to 100% by weight of the active compound.

Fertilizer materials, other herbicidal agents, and other pest control agents such as insecticides and fungicides can be included in the herbicidal compositions of the invention if desired.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals—although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the present compounds.

For some purposes, a resinous or waxy carrier can be used, preferably one which is solvent soluble or thermoplastic, including fusible materials. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example, bees-wax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case, a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e. deflocculating or suspending agent, and if desired, a finely divided solid carrier and/or a wetting agent. The active ingreident can be in a particulate form or adsorbed on the carrier and preferably constitutes at least about 10%, more preferbly at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic and obtained in the refining of petroleum lubricating oil fractions with alkylene oxides such as ethylene oxide or propylene oxide, or with both ethylene oxide or propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentratates which are concentrated solutions or dispersion of the active ingredient in an organic liquid, preferably a water-insoluble organic liquid, containing an added emulsifying agent. These concentrates can also contain a proportion of water, for example, up to about 50% by volume based on the total composition, to facilitate subsequent dilution with water. Suitable organic liquids include, e.g., the above petroleum hydrocarbon fractions previously described.

The emulsifying agent can be of the type producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/or compositions described and claimed are prepared and/or used.

EXAMPLE 1

Preparation of N-(2-[4,5,6,7-tetrahydrobenzothienyl])-propionamide

A mixture of cyclohexanone, sulfur and ethyl cyanoacetate was reacted to produce 2-amino-3-carboethoxy-4,5,6,7-tetrahydrobenzothiophene according to the method described by Gewald [K. Gewald, E. Schinke, and H. Bottcher, Chem Ber., 99, 94 (1966)]. The above aminoester [0.1 mole] was saponified by refluxing it for 3.5 hours in a mixture of 4 N aqueous potassium hydroxide (100 cc.) and absolute ethanol (100 cc.). The cooled reaction mixture was diluted to 500 cc. with water and neutralized to pH 6.5–7.5 with concentrated HCl. The white solid which precipitated was collected, air-dried, and identified as 2-amino-3-carboxy-4,5,6,7,tetrahydrobenzothiophene by its infrared and nuclear magnetic resonance spectra. The above-amino-acid (5.0 grams, 0.025 mole) was dissolved in 50 cc. of ethanol (solution incomplete) and the solution was brought to reflux on a steam bath and then was removed from the heat source. To the hot solution was added a solution of oxalic acid (5.0 grams) in ethanol (25 cc.). Carbon dioxide was evolved and, when this evolution subsided, the reaction mixture was diluted with water (100 cc.) and extracted with methylene chloride (2× 50 cc.). The methylene chloride extract was washed with water (100 cc.) and saturated sodium chloride solution (100 cc.), dried over sodium sulfate, filtered and evaporated. The residual oil (whose infrared spectrum was consistent with that expected for 2-amino-4,5,6,7-tetrahydrobenzothiophene) was dissolved in dry benzene (20 cc.) and treated with propionic anhydride (3.0 grams, 0.025 mole). The mixture was allowed to stand for one hour at room temperature and the precipitated product was collected and washed with petroleum ether. Yield 2.5 g. (50%); melting point 166–167° C.

EXAMPLE 2

Preparation of N-(2-[4-methyl-4,5,6,7-tetrahydrobenzothienyl])-propionamide

N-(2-[4 - methyl-4,5,6,7-tetrahydrobenzothienyl])-propionamide was prepared according to the procedure outlined in Example 1. The structure was confirmed by infrared and nuclear magnetic spectra. Yield 32%, melting point 101–104° C.

EXAMPLE 3

Preparation of N-(2-[6-methyl-4,5,6,7-tetrahydrobenzothienyl])-propionamide

N-(2-[6-methyl-4,5,6,7-tetrahydrobenzothienyl]) - propionamide was prepared according to the procedure outlined in Example 1. The structure was confirmed by infrared and nuclear magnetic spectra. Yield 70%, melting point 138–140° C.

EXAMPLE 4

Preparation of N-(2-[5,5,7-trimethyl-7-cyano-4,5,6,7-tetrahydrobenzothienyl])-propionamide N-(2-[5,5,7 - trimethyl-7-cyano - 4,5,6,7 - tetrahydrobenzothienyl])-propionamide was prepared according to the procedure outlined in Example 1. The structure was confirmed by infrared and nuclear magnetic spectra. Yield 32%, melting point 107–109° C.

EXAMPLE 5

Preparation of N-methyl-N'-(2-[4,5,6,7-tetrahydrobenzothienyl])-propionamide 2-amino-3-carboethoxy - 4,5,6,7 - tetrahydrobenzothiophene (5.5 g. 0.03 mole) was dissolved (partial solution) in 55 cc. of hot ethanol and treated with a solution of oxalic acid (5.1 grams) in 25 cc. of ethanol. The reaction was worked up as described above and the crude amine was dissolved in benzene (20 cc.). This solution was treated with methyl isocyanate (1.3 g.) in benzene (5 cc.). The reaction mixture was allowed to stand for one hour at room temperature and the precipitate was collected and recrystallized from methanol. Yield 3.4 g. (60%); melting point 180–181° C.

EXAMPLE 6

Preparation of N-methyl-N'-(2-[6-methyl-4,5,6,7-tetrahydrobenzothienyl])-urea

N-methyl - N' - (2-[6-methyl-4,5,6,7-tetrahydrobenzothienyl])-urea was prepared according to the procedure outlined in Example 5. The structure was confirmed by infrared and nuclear magnetic spectra. Yield 55%, melting point 180–182° C.

EXAMPLE 7

Preparation of N,N-dimethyl-N'-(2-[5,5,7-trimethyl-7-cyano-4,5,6,7-tetrahydrobenzothienyl])-urea 2-amino-3-carboxy-5,5,7-trimethyl - 7 - cyano-4,5,6,7-tetrahydrobenzothiophene (7.8 g., 0.03 mole) was decarboxylated in the manner described above. The crude amine obtained after evaporation of the methylene chloride extract was in pyridine (10 cc.) and treated with a solution of dimethylcarbamoyl chloride (3.2 grams, 0.03 mole) in pyridine (15 cc.). The reaction mixture was heated gently on a steam bath (1.5 hours), cooled, and evaporated on a rotary evaporator. The residue was triturated with 50% aqueous ethanol and the insoluble material was collected and recrystallized from aqueous ethanol (50%). Yield 2.3 g. (30%); melting point 108–120° C. The structure was demonstrated by infrared and nuclear magnetic resonance spectra.

In this example, representative compounds of this invention were evaluated for post-emergence activity. The test procedure was as follows:

Two flats seeded with six crops (cotton, soybean, alfalfa, corn, rice and oats) and six weeds (mustard, morning glory, crabgrass, foxtail, barnyard grass and zinnia) and held until the first true leaves had appeared on all plants which were then sprayed at the rate of 10 lbs./acre. The test chemicals were sprayed as acetone solutions of very small particle acetone suspensions on the test plants. Sprayers were calibrated to deliver a certain volume of liquid and the calculated amount of active ingredient which would give a rate corresponding to the indicated pounds per acre. The plant responses were rated 12–16 days after treatment. Response was rated by a scale of 0–10. The 0–10 scale is defined as: 0=no injury; 1–3=slight injury; 4–6=moderate injury, plants may die; 7–9=severe injury, plants will probably die; 10=all plants dead (complete kill). Results of this test are shown below in Table I.

TABLE I.—POST-EMERGENCE HERBICIDAL ACTIVITY

| Compound | Rate, lb./a. | Barnyard grass | Crabgrass | Foxtail | Zinnia | Mustard | Morning glory | Cotton | Soybean | Alfalfa | Corn | Rice | Oats |
|---|---|---|---|---|---|---|---|---|---|---|---|---|---|
| N-(2-[4,5,6,7-tetrahydrobenzothienyl])-propionamide | 10 | 10 | 10 | 10 | 10 | 9 | 8 | 4 | 8 | 9 | 9 | 4 | 3 |
| N-(2-[6-methyl-4,5,6,7-tetrahydrobenzothienyl])-propionamide | 10 | 7 | 9 | 10 | 9 | 9 | 10 | 6 | 6 | 9 | 5 | 4 | 4 |
| N-(2-[5,5,7-thrimethyl-7-cyano-4,5,6,7-tetrahydrobenzothienyl])-propionamide | 10 | 9 | 10 | 10 | 10 | 10 | 10 | 10 | 10 | 9 | 4 | 3 | 3 |
| N,N-dimethyl-N'-(2-[5,5,7-trimethyl-7-cyano-4,5,6,7-tetrahydrobenzothienyl])-urea | 10 | 2 | 7 | 8 | 4 | 5 | 1 | | | | | | |

What is claimed is:
1. A compound of the formula

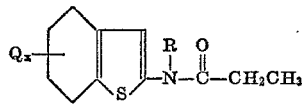

wherein Q is hydrogen, methyl, cyano, methoxy, nitro, trifluoromethyl or methoxymethyl; $x$ is an integer ranging from 0 to 4; and R is hydrogen or methyl.

2. A compound according to claim 1 which is N-(2-[4,5,6,7-tetrahydrobenzothienyl])-propionamide.

3. A compound according to claim 1 which is N-(2-[6-methyl-4,5,6,7-tetrahydrobenzothienyl])-propionamide.

4. A compound according to claim 1 which is N-(2-[5,5,7-trimethyl-7-cyano-4,5,6,7-tetrahydrobenzothienyl])-propionamide.

References Cited
UNITED STATES PATENTS
3,558,606  1/1971  Tinney _____ 260—239.3

HENRY R. JILES, Primary Examiner
C. M. S. JAISLE, Assistant Examiner

U.S. Cl. X.R.
71—90; 260—294.8 C, 329 HS, 329 S, 329 F, 332.2 C, 332.3 P, 332.5